Oct. 15, 1946.  J. W. BRIGHT  2,409,537
EXCESSIVE SPEED EXHIBITOR
Filed June 29, 1942  2 Sheets-Sheet 1
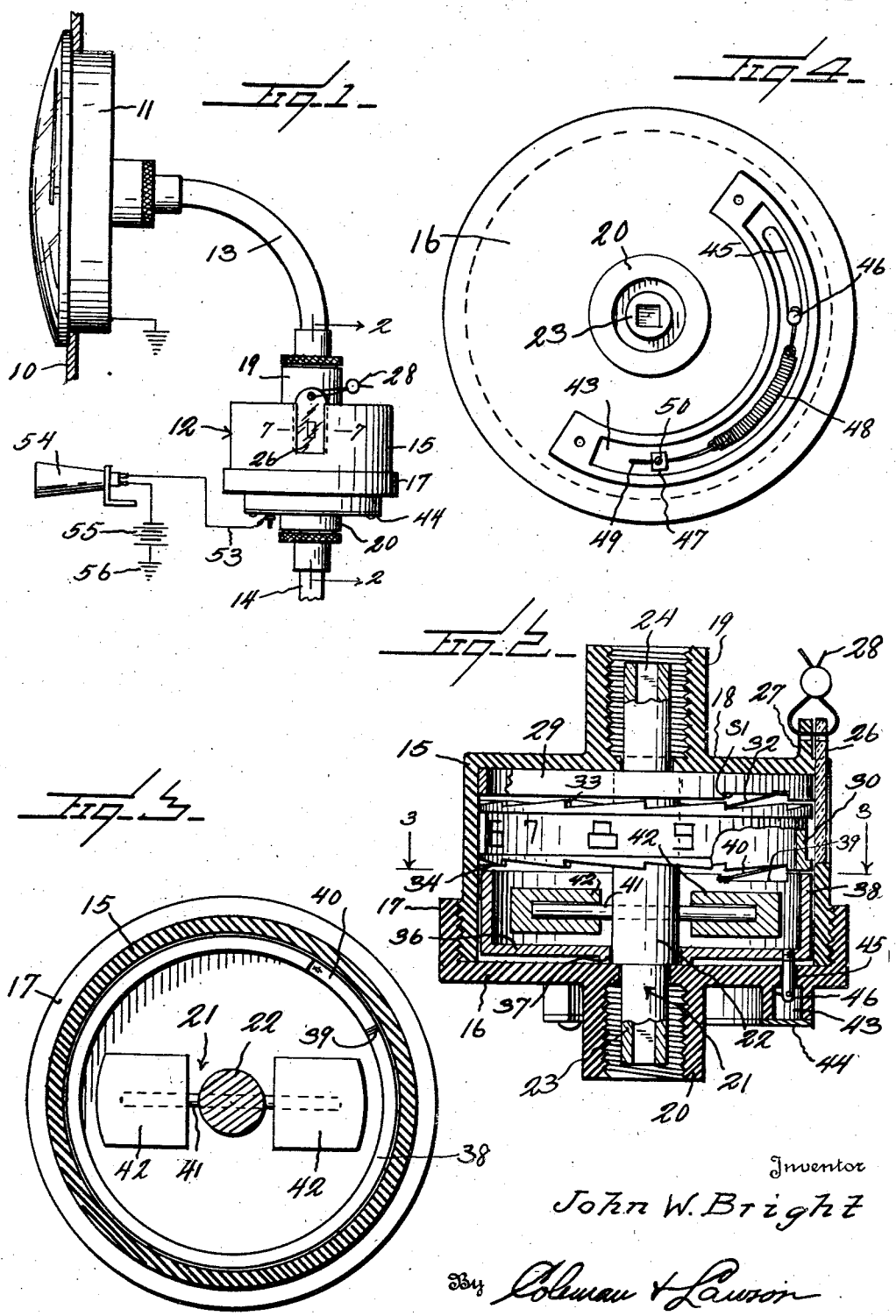
Inventor
John W. Bright
By Coleman & Lawson
Attorneys Oct. 15, 1946.                J. W. BRIGHT                2,409,537
                        EXCESSIVE SPEED EXHIBITOR
                         Filed June 29, 1942            2 Sheets-Sheet 2
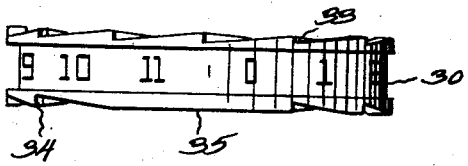
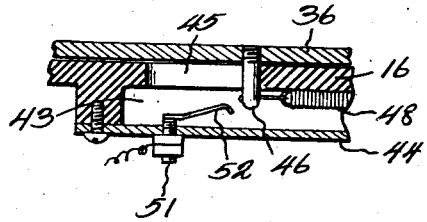
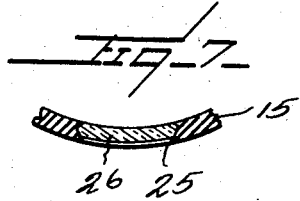
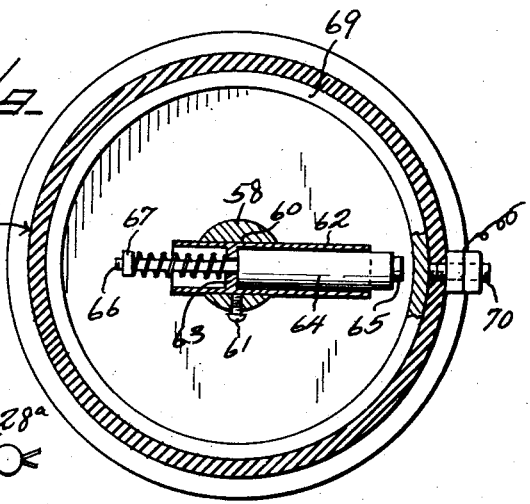
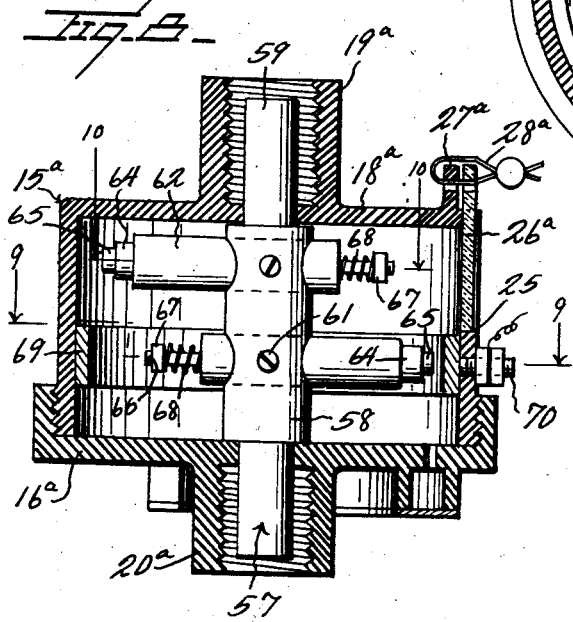
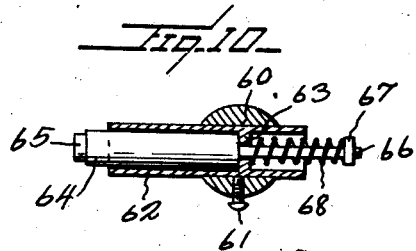
Inventor
John W. Bright
By Coleman & Lawson
            Attorneys Patented Oct. 15, 1946

2,409,537

UNITED STATES PATENT OFFICE 2,409,537

EXCESSIVE SPEED EXHIBITOR

John W. Bright, Los Angeles, Calif.

Application June 29, 1942, Serial No. 448,973

9 Claims. (Cl. 234—70)

This invention relates generally to appliances for motor vehicles and pertains particularly to appliances for use in association with a motor vehicle speedometer for informing the vehicle operator of excessive speed and for exhibiting a record of the notification.

The principal object of the present invention is to provide an improved novel device designed to be conveniently coupled with a motor vehicle speedometer to be operated simultaneously therewith, which when properly set will give the motor vehicle operator a warning when the vehicle is running at or has exceeded the maximum allowed speed, and which will also make a permanent exhibit when such maximum speed is exceeded beyond a predetermined point.

Another object of the invention is to provide a device of the character stated for insertion in the operating cable of a motor speedometer and which will function according to a previously determined setting, and without interfering with the normal operation of the speedometer, to warn the motor vehicle operator when the vehicle is being run at or above the stated predetermined speed setting.

Still another object is to provide an instrument of the character above stated wherein, in addition to giving the motor vehicle operator a sound warning or other suitable type of warning when the predetermined speed is being exceeded, will provide a permanent exhibit if such speed is further increased beyond a small predetermined margin so that an examination of the instrument will show that the vehicle has been operated at a higher speed than that selected.

Still another object is to provide in an instrument designed to give a signal and make a permanent exhibit as above stated, a means whereby the fact of the operation of the vehicle at excessive speed may be easily observed without removing the instrument from its operating position, and without having to open any part of the instrument, thus making it possible for a seal to be applied to the instrument to prevent tampering with the same after an excessive speed exhibit has been made.

The invention will be best understood from a consideration of the following detailed description taken in connection with the accompanying drawings, it being understood, however, that the invention is not to be considered as limited by the specific illustration or description but that such illustration and description constitute a preferred embodiment of the invention.

In the drawings—

Figure 1 is a view illustrating one embodiment of the present invention in side elevation and connected with a motor vehicle speedometer.

Figure 2 is a sectional view taken substantially upon the line 2—2 of Figure 1.

Figure 3 is a sectional view taken substantially upon the line 3—3 of Figure 2.

Figure 4 is a view in elevation of the covered end of the instrument.

Figure 5 is a detail view of the exhibit wheel per se of the instrument.

Figure 6 is a fragmentary detail illustrating the signal circuit closing means.

Figure 7 is a sectional view taken on the line 7—7 of Figure 1.

Figure 8 is a sectional view axially through another embodiment of the invention.

Figure 9 is a sectional view taken substantially on the line 9—9 of Figure 8.

Figure 10 is a sectional view taken on the line 10—10 of Figure 8.

Referring now more particularly to the drawings, the numeral 10 in Figure 1 designates a portion of an instrument panel upon which is mounted the usual speedometer 11. The numeral 12 generally designates one embodiment of the present excessive speed reminder and exhibitor which is operatively coupled in the driving shaft or cable for the speedometer 11, a portion of which cable is indicated at 13, and connects between one side of the invention and the speedometer while the other portion of the cable is indicated at 14 and leads from the driving or operating source to the rotary mechanism of the instrument 12. The coupling portion 13 of the cable is preferably curved so that the instrument 12 may be disposed in a convenient position with respect to the instrument panel 10 to be readily examined without having to be removed from working position.

The invention comprises a circular housing formed of the body portion 15 and the removable cover portion 16, which latter is provided with a flange 17 to encircle the body portion and threadably connect therewith. The housing is of circular form as shown, and the end wall 18 of the body portion has an interiorly threaded hub 19 formed integral therewith for threaded connection with an end of the portion 13 of the driving cable while the central part of the cover 16 has a similar interiorly threaded hub 20 for connection with an end of the portion 14 of the cable, these hubs being axially aligned one with the other and upon the axial center of the housing.

In accordance with the present invention there is provided a shaft 21 which has a central portion 22 and the two terminal extensions 23 which are of smaller diameter than the central portion and which are provided with the bores 24 which open through their ends and are of polygonal cross-section to facilitate their connection with the ends of the cable portions 13 and 14. The ends of the portion 22 of the shaft are held between the cover 16 and wall 18 of the casing and the reduced extensions 23 extend into the adjacent hubs 19 and 20, as illustrated in Figure 2.

A portion of the circular or side wall of the housing body 15 is cut out to form a window opening 25, the opposite longitudinal edges of which are grooved, as shown in Figure 7. Slidably extended into this window opening is a ground glass window or panel 26 which has sharpened or ribbed longitudinal edges for sliding engagement in the groove of the opening 25. As shown in Figure 2, this panel 26 is of a length to extend beyond the wall 18 of the housing body and this wall is provided with the ear 27 adjacent the window opening, which is covered by the extended portion of the glass panel so that a sealing wire 28 may be passed through aligned openings of the ear and glass panel, as shown in Figure 2. The inner surface of the glass panel or window is flush with the circular inner wall surface of the housing body 15.

The numeral 29 designates a ring which is frictionally held within the housing and adjacent this ring there is disposed in the housing the exhibit annulus 30. The exhibit annulus is of an overall diameter to fit within the housing so that it may be freely rotated around the shaft 21 and the central part of its outer peripheral surface is slightly depressed as shown and is provided with a series of spaced numerals starting with a cipher. This annulus 30 is adjacent to the ring 29 and the opposing edge of the ring 29 is cut out or recessed, as indicated at 31, and has secured therein the resilient latching or stop finger 32.

The edge of the annulus 30 opposing the ring 29 is provided with a series of notches 33 corresponding in number with the number of numerals upon the peripheral surface of the annulus.

The edge of the annulus 30 remote from the ring 29 also has a number of notches 34 formed therein and the number of these is one less than the number of numerals upon the annulus, the edge of the annulus between the highest numeral and the cipher being unnotched or straight, as indicated at 35 in Figure 5. The purpose for this straight or unnotched section will become apparent in the description of the operation of the instrument.

Disposed between the exhibit annulus 30 and the cap or cover 16 is a clutch drum 36 which has a hub portion 37 through which the central or enlarged part 22 of the shaft passes freely so that the drum is free to rotate or turn on the shaft. The edge 38 of the drum opposes that edge of the annulus 30 having the notches 34 therein and this edge of the drum is provided with the recess 39 in which is fixed, at one end, the leaf spring finger 40, the free end of which extends outwardly and contacts the adjacent notched edge of the annulus 30. This spring finger 40 is directed or extends in the same direction as the finger 32 so that upon turning of the drum in counterclockwise direction this spring finger 40 will engage in the nearest notch and impart rotary movement to the annulus.

Extending transverely through the shaft in that portion which is encircled by or within the drum 36, is a fixed pin 41, the two ends of which extend a substantial distance beyond the shaft, as shown in Figure 2, and each of these ends of the pin has loosely slidably supported thereon a carbon friction shoe 42. These shoes are designed to move outwardly by centrifugal force during rotation of the shaft for frictional engagement with the inside of the drum, and when the rotation of the shaft becomes fast enough to set up the desired amount of frictional engagement with the drum, the drum will be caused to turn and will turn the annulus 30.

Upon the outer side of the cover 16 there is formed a channel 43 which is substantially semicircular, as shown in Figure 3, and is concentric with the shaft. This channel is closed at its end and it has the arcuate removable cover plate 44 by which it is tightly closed.

Adjacent one end of the channel the cover 16 has the short arcuate slot 45 formed therein and there extends through this slot into the channel 43 a contact finger 46 which is secured at its inner end to the adjacent flat wall of the friction drum.

Adjacent the opposite end of the channel 43 from the slot 45 is a fixed post 47. Disposed within the channel, between the fixed post 47 and the contact finger 46, is a contractile spring 48, one end of which is secured to the finger 46 while the other end, indicated by the numeral 49, passes through a suitable aperture in the post 47 and is secured by a set screw 50. Thus, by loosening the screw 50 the end 49 of the spring can be shifted so as to increase or decrease the pull of the spring upon the contact finger 46, and it will also be noted that because of this spring the drum 36 is maintained normally in one position and the finger 46 is in the end of the slot 45 nearest the fixed post. When rotary movement is imparted to the drum by the carbon contact or friction shoes 42 the movement of the drum will be in opposition to the pull of the spring 48. Consequently, by adjusting the tension of the spring the instrument can be set so that the drum will not move until the speed of the vehicle reaches a predetermined value where the frictional engagement between the shoes and the drums will be strong enough to hold the drum and cause it to turn against the tension of the spring. Thus, it will be apparent that if the speed exhibiting instrument is set to function when the speed of the motor vehicle reaches forty miles per hour, the frictional engagement between the shoes and the drum will be sufficient at this speed to cause the drum to turn. When this occurs the drum-carried spring finger 40 will engage in the nearest notch of the adjacent edge of the exhibit annulus 30 and cause the annulus to turn one notch or one step. At the start the cipher upon the exhibit annulus will be seen through the observation window 26, as shown in Figure 1, and when the maximum speed is reached so that the annulus is moved it will be moved so as to bring the numeral 1 into position to be viewed through the window, thus indicating that the vehicle operator has exceeded the maximum speed one time. The slot 45 limits the movement of the drum 36 so that continued speeding beyond the limit will not cause the drum to move beyond the first position. It will be necessary for the vehicle operator to cut down his speed so that the spring 48 can return the drum to its normal position before the drum can be again rotated to effect turning of the annulus to bring the second numeral into position before the observation window.

In order that the vehicle operator may be appraised of the fact that he is approaching the limit or is about to go over the limit of speed desired for the vehicle, the cover 44 for the channel carries a terminal pin 51 which upon its inner end is connected with a contact spring 52 and this spring is located so that it will be engaged by the contact finger 46 shortly after the drum begins to turn and when the contact finger has moved through a short extent only of the slot 45. This terminal 51 is electrically connected by the wire 53 with one side of the vehicle horn which is indicated at 54, the other side of the horn being connected in the usual manner with one side of the vehicle battery 55, the opposite side of which is grounded, as at 56, and in the customary manner. Since the housing 15, together with the cover 16 therefor and the cover 44 for the channel are all formed of some suitable insulation material it will be apparent that it will only be after the finger 46 engages the contact spring 52 that the horn will be grounded and will thus be caused to give a signal. This signal may be given when the vehicle speed reaches, say thirty-seven or thirty-eight miles an hour, thus giving the operator a leeway of two or three miles before the maximum speed is reached and the annulus 30 is turned to the position where one of the numerals will be observable through the window 26.

It will be apparent upon considering Figure 2 of the drawings that the spring finger 32 merely acts as a check means to prevent the annulus from being moved back when the finger 40 is shifted back to its original position.

After the exhibit annulus has been shifted, the required number of times to bring into position behind the observation window 26 the last or highest numeral upon the annulus and the vehicle speed is dropped or slackened so that the friction drum 36 moves back to its original position, the shifting spring finger 40 will ride onto the unnotched stretch 35 of the exhibit annulus and, consequently, if the speed of the car is again increased beyond the maximum the spring finger 40 will merely slide along the straight surface 35 and, having no notch in which to engage, it will not cause the exhibit annulus to be shifted again and the cipher cannot, therefore, be moved back into position behind the window.

In Figures 8 to 10 inclusive another and simpler embodiment of the invention is illustrated which uses the same housing and cover structure as that shown in Figures 1 and 2, the inside elements only being changed.

The housing of this modified embodiment is indicated generally by the reference 15a, the cap being indicated by the numeral 16a, the end wall of the housing being designated 18a, while the hubs for the reception of the opposing ends of the speedometer cable are designated 19a and 20a.

The sight window opening is indicated at 25a, while the window is indicated at 26a and this cooperates with the ear 27a which forms an integral part of the housing and is coupled with the ear by the steel wire 28a. In this modification of the invention a line or mark record is formed upon the inner side of the window 26a when the maximum speed has been reached or exceeded and an audible signal is given in advance of this operation by the housing enclosing mechanism about to be described.

The numeral 57 generally designates the shaft which has the enlarged central portion 58 and the reduced ends 59 with which the speedometer cable portions 13 and 14 connect. The central portion 58 of the shaft is held between the cover 16a and the end wall 18a of the housing and is provided with two transverse passages 60 and the two set screws 61, each of which extends at its inner end into a passage 60, as shown in Figures 9 and 10.

Extending through each of the shaft passages 60 is a tubular guide 62 which has a centrally apertured partition 63 adjacent one end. Slidably supported in each tubular guide 62 is a pin 64, one end of which engages the partition 63 of the guide while the other end extends beyond the end of the guide and carries a carbon tip 65. At its other end each pin carries a stem 66 which extends through the central opening of the partition 63 and beyond the opposite end of the guide and the stem carries upon its outer end the nut 67 between which and the partition 63 is an expansion spring 68 which normally functions to draw the pin 64 inwardly.

As shown in Figure 8, one of the pins 64 is located to pass across the window 26a upon rotation of the shaft 57, while the other pin is in a position where the carbon tip 65 thereof will not contact the window 26a when the pin moves outwardly.

This other pin is encircled by a metallic contact ring 69 which is frictionally held within the housing in position to encircle that guide and pin which is disposed at one side of the window. The housing, which is of insulation material as previously stated, has secured therein a terminal post or screw 70 which is in electrical contact with the ring 69 and to this terminal post is connected the wire 53 of the vehicle horn.

In order to properly balance the rotating parts the tubular guides are disposed so that the longer ends will be upon opposite sides of the shaft. The degree of centrifugal force necessary to move the pins outwardly against the tension of the springs is determined by shifting the guides transversely of the shaft in the openings 60. In practice that guide which is encircled by the ring 69 will be set so that the tip of the pin will move out and into contact with the ring before the tip of the other guide is forced out into contact with the inner wall surface of the housing. Thus, the first tip to move out to contact with the metallic ring will short the horn and give warning to the vehicle operator that he is approaching the maximum speed, and if he does not then reduce his speed but continues to increase it the other pin will move out until the tip thereof is sliding over the inner surface of the housing and, consequently, it will slide across the ground glass window 26a and the carbon will make a mark across this window which will indicate to anyone examining the instrument that the driver has exceeded the speed limit for which the instrument is set and at which the vehicle is to be operated.

From the foregoing it will be readily apparent that the two embodiments of the invention herein disclosed provide a novel means for maintaining a check upon a vehicle driver where it is desired that the driver operate the motor vehicle at a desired speed, and it also provides a novel means of making an exhibit when the driver exceeds the maximum speed so that the owner of the vehicle or public authorities can check the instrument, particularly if the vehicle has been involved in an accident, to determine whether the vehicle operator might be considered as being to blame for such accident.

I claim:

1. A recording device comprising a circular casing having spaced end walls provided with axially aligned openings, a shaft disposed axially in the casing and having its ends disposed in and extending through said openings for connection at one end with a source of driving power, a window mounted in the circular wall of the casing, a movable recording means supported on the shaft in the casing for movement around the axis of said shaft on a line in a plane perpendicular to the axis, and means actuated by centrifugal action upon rotation of the shaft at a predetermined speed for operating the recording means to provide a permanent record at the inner side of and viewable through said window.

2. An information supplying device comprising a completely closed casing having a circular chamber and opposite end walls, said end walls having axial openings therein, a shaft extending axially through the chamber and having its ends supported in and extending through said openings for connection at one end with a source of power by which the shaft is rotated, a window panel set in the circular wall of the chamber, an element carried by said shaft for movement on a line in a plane perpendicular to the shaft under centrifugal action upon rotation of the shaft, and information supplying means which is made operative upon outward movement of said element at a predetermined speed of rotation of the shaft to disclose through said window panel and from within the closed casing that the shaft has operated at the stated predetermined speed.

3. A device as set forth in claim 2, in which said information supplying means comprises a marking element carried by the centrifugally actuated element for movement across and in contact with the inner surface of said window to make a record mark upon the window.

4. A recording device, comprising a circular casing having spaced end walls provided with axially aligned openings, a shaft disposed axially in the casing and having its ends rotatably supported in and extending through said openings for connection of one of the ends with a source of power, a window mounted in the circular wall of the casing adjacent one of said end walls, said shaft having a transverse passage therethrough, a sleeve extending through said passage and adjustably secured therein to facilitate adjustably positioning one end of said sleeve relative to that circular area of the circular wall in which the window is located, a pin slidably supported in the sleeve for movement through the said one end thereof, a marking element carried by said pin for wiping contact across the window, and spring means for operatively coupling the pin with its sleeve and resisting movement of the pin radially outwardly under centrifugal action during rotation of the shaft.

5. An information supplying device, comprising a casing having a circular chamber and opposite end walls, said end walls having axial openings therein, a shaft extending axially through the chamber and having its ends supported in and extending through said openings for connection at one end with a source of power by which the shaft is rotated, a window set in the circular wall of the chamber, an element supported by said shaft for radial movement under centrifugal action upon rotation of the shaft, and information supplying means which is made operative upon outward movement of said element at a predetermined speed of rotation of the shaft to disclose through said window that the shaft has operated at the stated predetermined speed, the said means including an annulus rotatable around the shaft and bearing peripheral numerals which are viewable through said window.

6. An information supplying device, comprising a casing having a circular chamber and having spaced end walls provided with axially aligned openings, a shaft extending axially through the chamber and having its ends disposed in and extending through said openings and supported for rotation, said shaft being adapted for connection at one end with a source of power, means providing a sight window in the wall of the chamber, an annulus supported within the chamber and encircling the shaft and having its periphery positioned to be viewed through said window, said annulus having spaced arbitrary designations upon its periphery viewable through the window and for exhibiting a predetermined degree of turning of the annulus, a drum supported for rotation on and about the shaft and adjacent to said annulus, an operative coupling between the drum and the annulus whereby upon rotation of the drum in one direction through a predetermined extent a predetermined degree of turning will be given the annulus to bring one of said designations in position for view through the window, centrifugally actuated means for establishing driving connection between the shaft and the drum, and means for holding said drum against turning until a predetermined degree of force is established in said driving connection.

7. A structure as set forth in claim 6, in which said driving connection comprises a radially movable friction shoe supported upon the shaft within the drum for contact with the inner wall surface of the drum.

8. An information supplying device, comprising a casing having a circular chamber and spaced end walls provided with axially aligned openings, a shaft extending axially through the chamber and having its ends rotatably supported in and extending through said openings, said shaft being designed for connection at one end with a source of driving power, a sight window mounted in the circular wall of the chamber, an annulus rotatably mounted within the chamber for rotary movement on the axis of the shaft and in position to have its periphery viewed through said window, said periphery having register indicia thereon, said annulus having one edge provided with a series of notches, a drum supported upon the shaft for rotation thereabout and independently thereof and upon the notched side of said annulus, a resilient finger carried by the drum and having sliding contact with the notched edge of the annulus for engagement in said notches to turn the annulus upon rotation of the drum in one direction, means limiting the rotation of the drum to a distance substantially equalling the distance between remote ends of adjacent notches, spring means normally resisting the turning of the drum in the said one direction, and centrifugally actuated means carried by the shaft for establishing a frictional connection between the shaft and the drum upon rotation of the shaft at a predetermined speed sufficient to overcome the resistance of said resilient means to turn the drum through the limit of its movement.

9. An information supplying device, comprising a completely closed casing having a circular chamber, a rotatable shaft extending axially through the chamber and adapted for connection at one end with a source of power by which the shaft is rotated, a window panel secured in the circular wall of the chamber, an element carried by the shaft for movement in a fixed path in a plane perpendicular to the shaft and adapted to be shifted outwardly in said path by centrifugal force upon rotation of the shaft, and a movable information imparting means completely enclosed in the casing and which is caused to move across the inner side of said window panel by and as a result of the radial outward movement of said element to a predetermined extent at a predetermined speed of rotation of the shaft, to effect the placement of information at the inner side of the window and visible therethrough to indicate that the shaft has operated at the stated predetermined speed.

JOHN W. BRIGHT.